United States Patent
Apostolos et al.

(10) Patent No.: US 8,090,337 B2
(45) Date of Patent: Jan. 3, 2012

(54) CHIRP FOURIER TRANSFORM METHOD AND APPARATUS FOR CANCELING WIDE BAND INTERFERENCE

(75) Inventors: John T. Apostolos, Lyndenborough, NH (US); Randolph K. Beltz, Greenfield, NH (US); Paul E. Gili, Mason, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 243 days.

(21) Appl. No.: 12/692,705

(22) Filed: Jan. 25, 2010

(65) Prior Publication Data

US 2011/0183622 A1    Jul. 28, 2011

(51) Int. Cl.
*H04B 1/10* (2006.01)

(52) U.S. Cl. ...... 455/296; 455/63.1; 455/24; 455/114.2; 375/254

(58) Field of Classification Search .................. 455/296, 455/63.1, 24, 114.2, 278.1, 67.11; 375/254; 370/278

See application file for complete search history.

(56) References Cited

U.S. PATENT DOCUMENTS

| | | | | |
|---|---|---|---|---|
| 4,475,214 A | * | 10/1984 | Gutleber | 375/254 |
| 4,991,165 A | * | 2/1991 | Cronyn | 370/278 |
| 5,047,736 A | * | 9/1991 | Ghose | 333/12 |
| 5,148,117 A | * | 9/1992 | Talwar | 330/151 |
| 5,428,831 A | * | 6/1995 | Monzello et al. | 455/296 |
| 5,574,978 A | * | 11/1996 | Talwar et al. | 455/63.1 |
| 5,584,065 A | * | 12/1996 | Monzello | 455/296 |
| 5,606,734 A | * | 2/1997 | Bahu | 455/303 |
| 6,385,435 B1 | * | 5/2002 | Lee | 455/24 |
| 6,724,840 B1 | * | 4/2004 | Osofsky et al. | 375/346 |
| 7,058,368 B2 | * | 6/2006 | Nicholls et al. | 455/114.2 |
| 7,133,416 B1 | * | 11/2006 | Chamdani et al. | 370/466 |
| 8,023,921 B2 | * | 9/2011 | Lackey | 455/307 |
| 8,032,103 B2 | * | 10/2011 | Lackey | 455/307 |
| 2004/0198295 A1 | * | 10/2004 | Nicholls et al. | 455/296 |
| 2010/0136925 A1 | * | 6/2010 | Lackey | 455/77 |
| 2010/0136941 A1 | * | 6/2010 | Lackey | 455/307 |

* cited by examiner

*Primary Examiner* — Minh D Dao
(74) *Attorney, Agent, or Firm* — Daniel J. Long

(57) ABSTRACT

A wide band frequency domain canceller is used in cosite mitigation interference in which a signal tapped from a transmit antenna is coupled to a Chirp Fourier Transform to covert the signal into the frequency domain. The frequency domain signal is vector multiplied with a path transform function to add the path transfer function values to the sampled signal, after which the processed frequency domain signal is converted back into the time domain by an Inverse Chirp Fourier Transform, after which it is inverted and coupled into the receive path of a cosited receiver.

16 Claims, 7 Drawing Sheets

CHIRP FOURIER TRANSFORM METHOD AND APPARATUS FOR CANCELING WIDE BAND INTERFERENCE

FIELD OF THE INVENTION

This invention relates to a method and apparatus for canceling interference from signals arriving at a receiver, and more particularly to the use of a Chirp Fourier Transform system for removing unwanted interference caused from nearby communications transmitters.

BACKGROUND OF THE INVENTION

Interference from nearby transmitters causes considerable problems for vehicle-mounted communications equipment, especially when the transmitter is co-located or cosited with a vehicle-mounted receiver. The interfering signals swamp the incoming signals making receipt of these signals difficult if not impossible through the interference.

The problem is especially severe when communications vans or vehicles have a number of transmitters with associated antennas on the vehicles, and where receivers within the vehicle are trying to listen to incoming communications signals at the same time the transmitters are transmitting. This is called cosite interference due to the co-location of antennas and communications equipment on the vehicle.

The problem exists in two situations, first for individuals seeking to transmit and receive at the same time using separate transceivers within the vehicle. Even if the signals are not on the same frequency spatter and unwanted harmonics oftentimes preclude receiving incoming signals.

Secondly, and perhaps more importantly, jamming signals are often employed to protect vehicles for instance from the detonating of improvised explosive devices (IEDs). Recently rather than utilizing detonator cords, cell phone activation of IEDs has been popular. This mode of detonation can be thwarted by providing jamming signals near the vehicle that swamps and/or defeats the transmissions from cell phones or other detonating transmitters. However in so doing, the jamming radiation also swamps the receiver in the vehicle and it is only with difficulty that this injected interference can be nulled.

As will be discussed, narrow band techniques involving numerous heavy coaxial delay lines have been employed. However, for narrow band systems in order to provide for instance a gigahertz of coverage the amount of space, weight and equipment is prohibitive.

By way of further background, oftentimes unwanted interference comes from signals which emanate from or exist near a receiver in which signals come from co-located or cosite transmitters located on a vehicle that has a number of transmitters that are used simultaneously. For instance, in a particular communications environment transceivers operating at different frequencies in the UHF and VHF bands are operated at the same time or with L band transceivers. Thus the transceivers are operated in different bands and with different modes of communication.

For example, when operating in the UHF region there may be a SATCOM transmitter nearby that is using a ground-based mode of communication in the same band as another SATCOM transceiver linked to a satellite.

As mentioned above, the other situation involving unwanted interference is when jamming signals are emitted from a vehicle for instance to jam transmitters that are trying to activate or detonate improvised explosive devices. This can occur through the use of cell phones or other transmitting devices. It will be noted that such devices operate over a wide range of frequencies and stepped jammers which frequency-hop their transmissions are in wide use.

Classical approaches to cosite mitigation involve passive frequency agile filters or active phase reversal techniques. In one active approach, power from each interfering transmit source is sampled using directional couplers, and then phase and amplitude matched for each interferer with the phase and amplitude matched signals injected out of phase into the receive path for phase-inversion cancellation, in which each frequency is a addressed in a separate channel.

Note that cancellation depth is highly dependant on how well the correlation (phase) and weighting (amplitude) hardware can match the interferer over frequency. As noted, cosite cancellation systems are exceedingly heavy and large in size driven largely by the length of delay lines required to match the interfering signal to the signal of interest. Moreover, lumped element components used to build the individual weight/correlators are heavy and large. Additionally, most suppliers of cancellation equipment avoid active electronics in the cancellation circuitry as they tend to generate self-noise which causes additional interference.

Put more simply, coaxial cable delay lines are utilized in the vehicles which snake around in the vehicle, with one delay line per frequency required. This makes a large tangle of delay lines within the vehicle simply to be able to select out and eliminate interfering signals, each at a different frequency. The reason for the requirement for so many delay lines is the fact that these systems are very narrow band and while they can be effective for the narrow banded signals, the weight of the delay lines, and the physical space of the snaking delay lines presents a problem.

Moreover, communications technology is moving away from low frequency, narrow band channels such as 25 kHz channels, to higher frequencies that can support wider waveforms capable of much greater data rates. These include wide band network waveforms and soldier radio waveforms. Inherently, lumped element components which are used to fabricate the amplitude the phase correction circuitry of the prior cancellers are narrow band. While filters and cancellers can be built to have wider bandwidths, the cost in terms of weight, size, insertion loss and fabrication complexity is prohibitive.

As a result an ideal canceller would desirably have a wide bandwidth, high dynamic range and be physically small.

In short, prior canceling systems involve narrow band cancellers. The narrow band cancellers operate to cancel the signals from an offending transmitter. This is accomplished by tapping some energy from the offending transmitter's antenna using a small directional coupler to bring the sampled signal to a place where one can make phase and amplitude adjustments so that one obtains the negative of the offending signal. The negative or phase reversed version of this signal is then coupled into the receive path to cancel the offending signal. Because of the narrow bandwidth of the cancellers, in order to do this one must adjust the phase and amplitude of the tapped signal and to do the adjustment every time one switches frequencies. Note that such multi-band cancellers typically only work over 1 MHz at most.

Such cancellers are thus inadequate to null the jamming signals now employed, which are frequency hopped and may cover a gigahertz in bandwidth. Since these systems are frequency agile, the offending signal can show up anywhere with in a very wide band spectrum. More importantly, the prior systems operate in the time domain as opposed to the frequency domain, the importance of which will be described below.

SUMMARY OF INVENTION

The subject system operates in the frequency domain which is inherently wide band while also preserving passive components. Size and weight are both dramatically reduced as the multiple long heavy coaxial cables used to supply signal delays in the time domain systems are eliminated. Moreover, only one multiplier or mixer is used in the subject system.

In order to cancel or mitigate the interfering signal using the frequency domain, first an interfering signal is sampled using a coupler. The sampled continuous waveform then undergoes a Chirp Fourier Transform (CFT) process which produces a spectrum of amplitudes versus frequency to characterize the tapped signal in terms of complex coefficients. As a result the system moves out of the time domain and into the frequency domain.

In order to provide a signal which is 180° out of phase to cancel the offending signal received at a receive antenna, a transfer function is established for the path between the two antennas. This transfer function represents the path in terms of complex coefficients that describe amplitude versus phase variations to the signal propagating along the path across the frequency spectrum of interest.

The frequency domain representation of the offending signal is then vector multiplied by the path transfer function in a continuous convolution process adds the path transfer function to the offending signal, all done in the frequency domain. The resultant signal is one that would be expected to exist at the receiving antenna.

Having processed the offending signal in the frequency domain, processing is reversed back into the time domain using an inverse Chirp Fourier Transform. The result is inverted and summed back into the receive path to cancel the offending signal from the incoming signal of interest.

It will be noted that the cancellation depth or success is proportional to how well the pass transfer function is estimated. To correct for environmental changes in the path transfer function, in one embodiment the subject system utilizes an adaptive sampling loop in one embodiment implemented using a least mean square algorithm. This feedback corrects the path transfer function by continuously detecting null depth and adaptively altering the path transfer function. The result is more complete cancellation and thus deeper nulls. As can be seen, the system operates on the general principle to cancel interfering signals in the frequency domain.

It will be noted that the advantage of the subject system over a Discrete Fourier Transform process is that with the Chirp Fourier Transform large instantaneous bandwidths are theoretically possible without discontinuities. Moreover, the amount of hardware is dramatically reduced.

In short an interfering signal is sampled, with the signal transformed into the frequency domain utilizing a Chirp Fourier Transform, whereupon it is vector multiplied by the path transfer function, with the result being applied to an Inverse Chirp Fourier Transform, the output of which is inverted to provide out of phase signals at a summation point in the receive path. Thus, the tapped offending signal is converted from a time domain signal to a frequency domain signal, is processed, and is then converted back to a time domain signal, inverted and coupled to the summation point to provide a deep 60 dB null of the offending signal.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
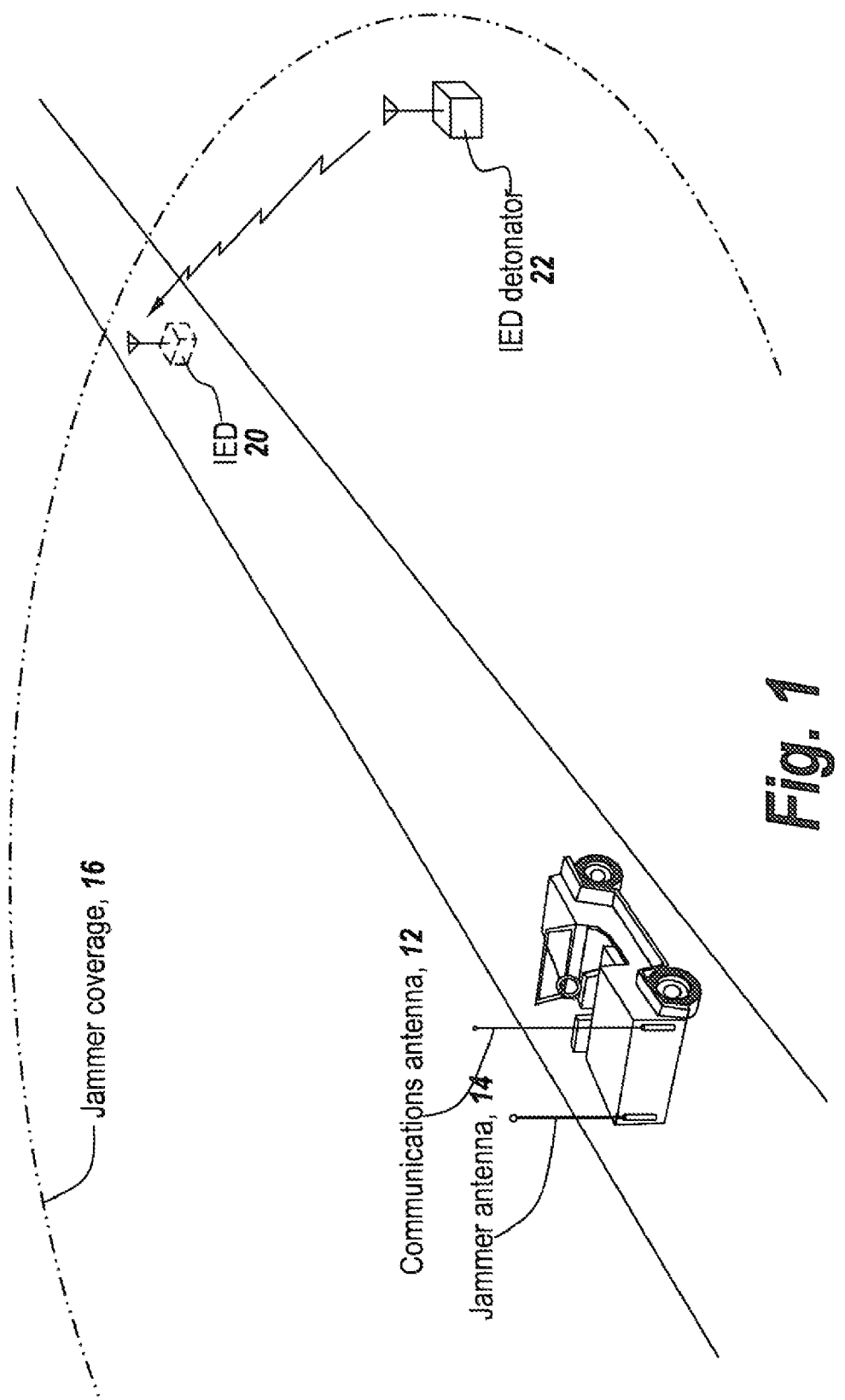
FIG. 1 is a diagrammatic illustration of a vehicle having communications capabilities in which a jammer antenna emits jamming radiation to jam activation or detonation of an improvised explosive device or IED, with the subject system permitting communications through the jamming radiation.
Figure 2:
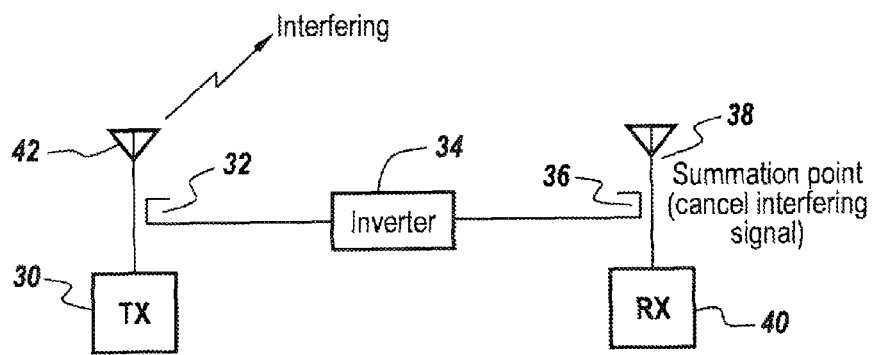
FIG. 2 is a diagrammatic illustration of the subject system in which interfering signals are tapped, processed, inverted and then injected into the signal path of a receiver to cancel the interfering signal.

Referring to FIG. 1, in one notable application of the subject system, a vehicle 10 is provided with a communications antenna 12 and an antenna 14 utilized to project jamming signals into an area 16, for instance to defeat the detonation of an improvised explosive device IED 20 that is detonated using a clandestine transmitter 22.

Transmitter 22 may be of the cell phone variety or can be any of a variety of transmitters operating for 30 MHz all the way up to tens of gigahertz. This requires a frequency agile frequency-stepping jammer to be able to cover a wide range of frequencies, since the operating frequency of transmitter 22 may be unknown.

The problem with such jamming is that while one may be able to jam the signal from transmitter 22 to IED 20, the jamming signal will also jam the communications equipment within vehicle 10. Since there are indeed a wide range of frequencies that can be employed by transmitter 22, the use of narrow band cancellers is counter-indicated. The reasons as mentioned before include the size and complexity of equipment involving multiple lengths of coaxial cable serving as delay lines for such equipment. It is therefore almost an impossibility to have such cancellers operate for instance between 30 MHz and 6 GHz due to the sheer volume of the coaxial delay lines themselves.

It will be noted that even when jamming is not employed, signals from co-located or cosited antennas can interfere with communications at transceivers within vehicle 10 such that even if they operate on different frequencies, splatter can materially and deleteriously affect communications.

In general, in order to be able to cancel out the interfering signals a sample of the interfering signal from a transmitter 30 is tapped utilizing a coupler 32 in which a time domain signal is inverted at 34 and is injected by a coupler 36 into the receive path 38 of a receiver 40. It is the purpose of this system to provide an out-of-phase signal to cancel that portion of the interfering signal emitted by antenna 42 and that is received by antenna 38.

How this is done in the subject system is described in connection with FIG. 3. Here a transmitter 50 transmits an interfering signal from antenna 52 that is detected by receive antenna 54, also called the victim receive antenna. As the signal propagates from antenna 52 to antenna 54 there is a transfer function T(f) which is the transfer function of the path between the interfering emitter antenna and the victim receive antenna. This path transfer function can be measured using a network analyzer for a given vehicle, and at least initially estimated.

In the subject system a portion of the emitted signal is coupled via a coupler 56 to a Chirp Fourier Transform 58 which transforms the offending signal in the time domain into the frequency domain. The path transfer function that has been previously established is stored in transfer function module 60. Module 60 is read out to a vector multiplier 62 which multiplies the complex coefficients of the output of the Chirp Fourier Transform with the complex coefficients of the path transfer function. This results in adding the path transfer function to the interfering signal so that when it arrives at the receive path it will be altered in accordance with the measured path transfer function to match the over-the-air interfering signal. These modified coefficients are coupled to an Inverse Chirp Fourier Transform 66 which converts the frequency domain signal into a time domain signal, which when inverted out of phase version with signals received by antenna 54. Thus the processed and phase inverted signal is coupled into the receive path here illustrated at 68 from antenna 54 to receiver 70 utilizing a coupler 72.

Figure 3:
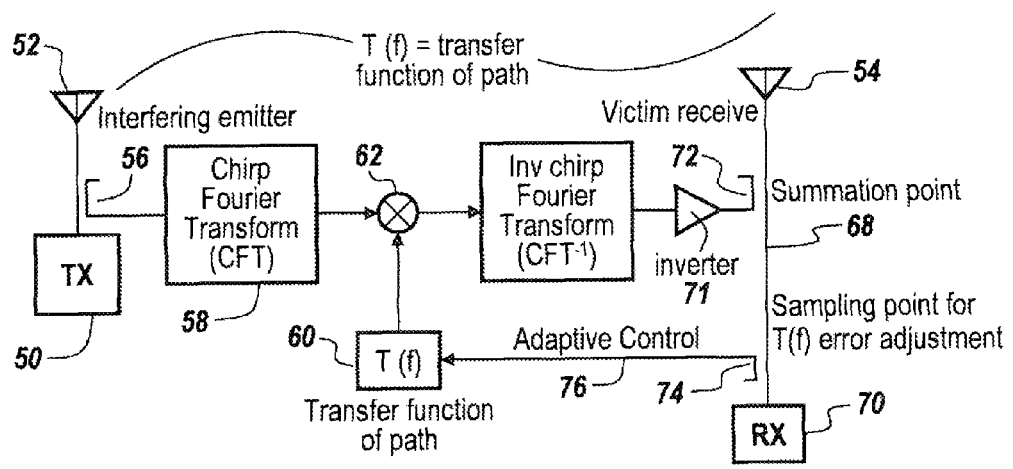
FIG. 3 is a diagrammatic illustration of the subject Chirp Fourier Transform approach through the implementation of the processing system of FIG. 2 showing the utilization of a Chirp Fourier Transform to transform the time domain tapped signal into a frequency domain signal, with the frequency domain signal being vector multiplied by the path transform function and applied to an Inverse Chirp Fourier Transform to convert the signal into the time domain, whereupon when inverted and summed into the receiver path the resulting signal cancels the interfering signal.

Note, a fixed delay line may be needed at the victim receive antenna, 54, in FIG. 3. This is to insure that, depending upon the distance of the interfering emitter from the victim antenna, we are within the capture range of the canceller; i.e. the delay from the interfering emitter to the victim receive antenna falls inside the synthesizable delay ranges of the canceller.

To the extent that the interfering signal is not completely cancelled from receive path 68, the depth of the nulls are detected at a sampling point corresponding to coupler 74. The depth of the nulls are fed back to modify the stored path transfer function data in transfer function 60 to adjust the transfer function in accordance with the sensed error.

In this way changing conditions between the antennas, such as for instance multi-path and other environmental factors which alter the transfer function, are corrected in an adaptive control operation by coupling the signal from coupler 74 over feedback line 76 to alter the path transfer function stored by unit 60.

Figure 4:
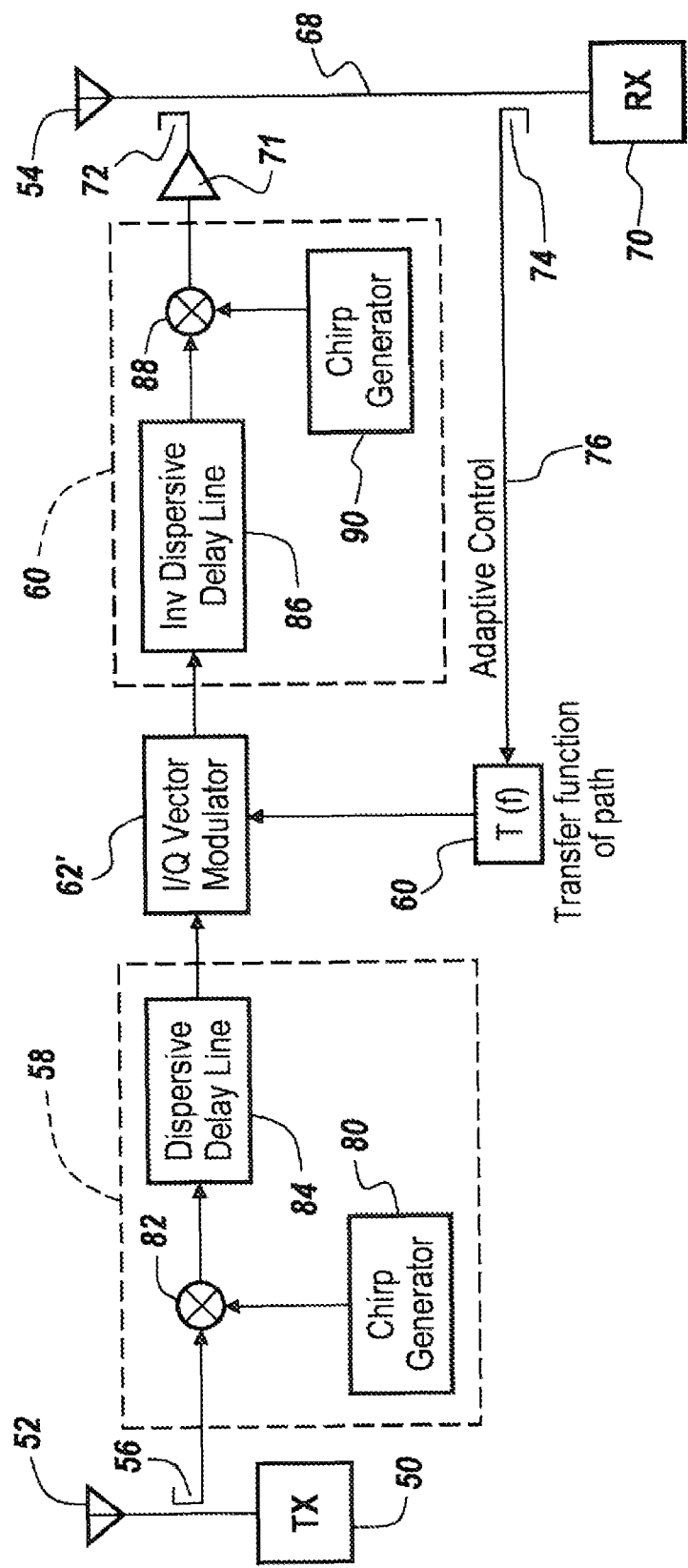
FIG. 4 is a diagrammatic illustration of the frequency domain canceller of the subject system in which the Chirp Fourier Transform is implemented using a first chirp generator and a first dispersive delay line and in which an Inverse Chirp Fourier Transform is implemented using a second dispersive delay line having an inverse delay characteristic to the first dispersive delay lines, and in which its output is coupled to a chirp generator having a chirp characteristic inverse to that of the first chirp generator.

Referring to FIG. 4, the Chirp Fourier Transform and Inverse Chirp Fourier Transform of FIG. 3 are implemented in one embodiment utilizing for Chirp Fourier Transform 58 a chirp generator 80 having an output signal multiplied at 82 with the signal from coupler 66. This chirped signal having a linear chirp characteristic is then coupled to a dispersive delay line 84, with the output of this delay line coupled to a vector multiplier in the form of an I/Q vector modulator 62'. The output of the vector modulator is applied to an inverse dispersive delay line 86 serving as Inverse Chirp Fourier Transform 66. The output of delay line 86 is coupled to a multiplier 88 provided with the output of a chirp generator 90 having a linear chirp characteristic opposite to that of chirp generator 80. This de-chirps the previously chirped signal. The output of multiplier 88 is inverted by an inverter 89 and is applied to coupler 72 to couple in the inverted and processed interfering signal into receive path 68.

This dispersive delay line/chirp generator implementation of the Chirp Fourier Transform provides an inexpensive, physically small and light weight implementation of the subject canceller.

Figure 5A:
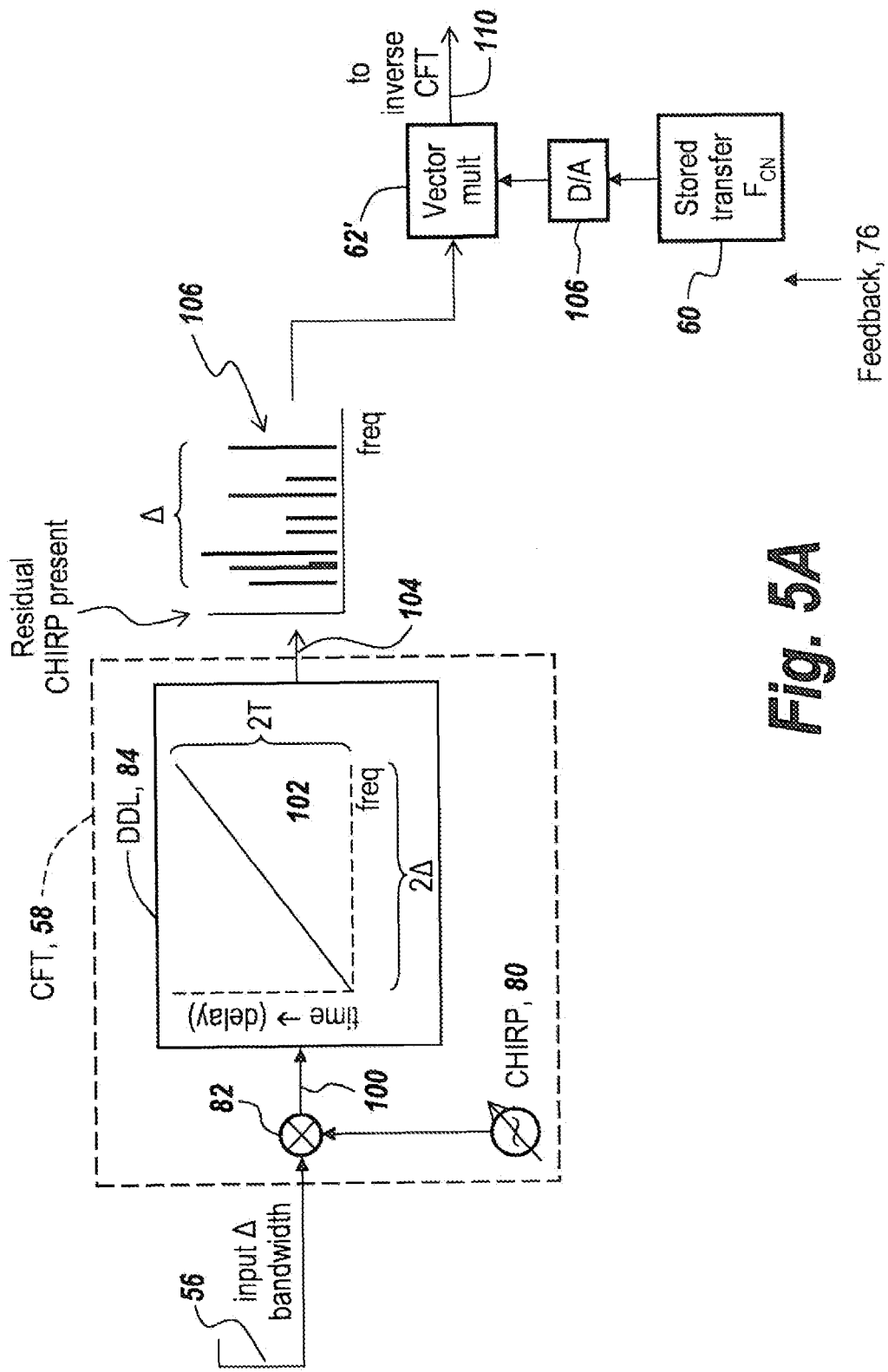
FIGS. 5A and 5B are diagrammatic illustrations of the operation of the system of FIG. 4 showing the use of surface electromagnetic dispersive delay lines both for the Chirp Fourier Transform and for the Inverse Chirp Fourier Transform to provide a frequency domain signal with a residual chirp that is de-chirped to provide a time domain signal that is inverted and summed with signals in the receive path.
Figure 5B:
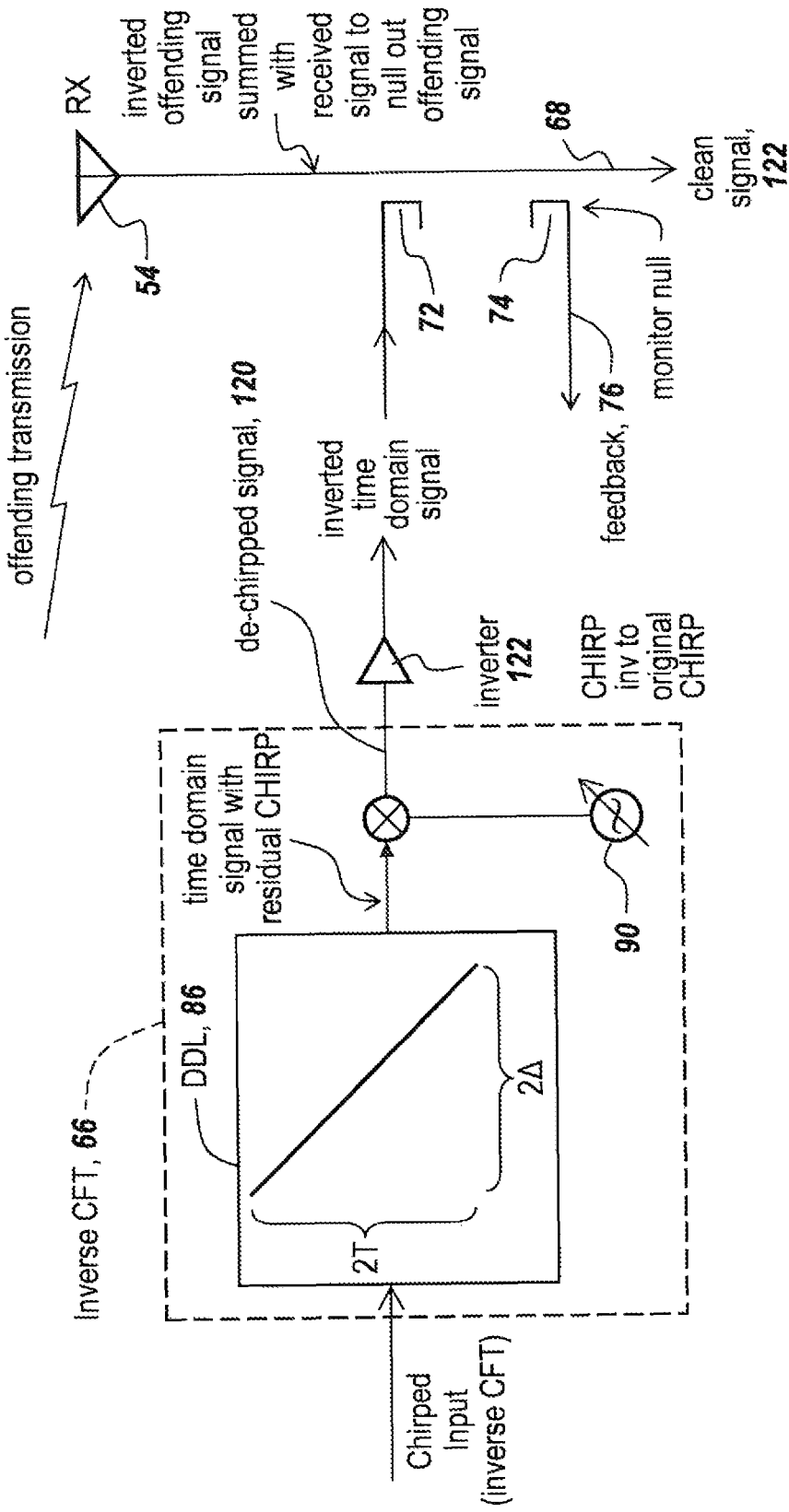

In more detail and referring now to FIGS. 5A and 5B, Chirp Fourier Transform 58 is provided by chirp generator 80, the output of which is multiplied by the input signal from coupler 56. Here the input bandwidth $\Delta$ describes the total input bandwidth over which the subject system is to operate. In one embodiment this bandwidth may be as wide as 1 GHz.

The chirped signal is coupled over line 100 to dispersive delay line 84 which has a linear delay characteristic 102 in which time (delay) is on the ordinate, and whereas frequency is on the abscissa. Note that the dispersive delay line slope covers twice the bandwidth and twice the delay, or $2\Delta$, 2T. The output of the chirped and delayed signal is available over line 104 and has a frequency versus amplitude spectrum as illustrated at 106. It is noted that the spectrum covers the $\Delta$ bandwidth, with a residual chirp present.

The result is that one takes time domain signals and converts them into frequency domain signals in which the frequency spectra of the incoming signal can be seen at 106 to involve a number of amplitude spikes a spread across a number of discrete frequencies.

The spectrum represents the complex coefficients of the interfering or offending signal in the frequency domain. These complex coefficients relate to amplitude and phase of the interfering or offending signal generated as a result of multiplying the input signal with the output of chirp generator 80. Thus, the input signal is completely characterized in the frequency domain through the use of the Chirp Fourier Transform and all the resulting amplitude and phase components.

Because the chirp of the input signal provides an extremely wide bandwidth, the subject system is able to respond to offending signals over a wide range of frequencies. The complex coefficients that are the result of chirping the input signal and providing it as an input to the dispersive delay line provides a wide frequency response.

This frequency response is vector multiplied at 62' by the stored transfer function available at transfer function module 60 which is converted by an analog-to-digital converter 106 into frequency domain components having complex coefficients that are vector multiplied with the complex coefficients of the output of the dispersive delay line. The result is a signal that has been modified by adding the path transfer function to it so that it will be identical to the offending signal that arrives at receive antenna 54.

The vector multiplied output is available over line 110. The output constitutes a chirped input to inverse CFT 66. The inverse CFT converts frequency domain signals into time domain signals. As can be seen, CFT 66 includes dispersive delay line 86. This delay line has a delay characteristic that is inverse to the delay characteristic of dispersive delay line 84 to provide the inverted CFT. The delay characteristic of delay line 86 also has a linear 2T, $2\Delta$ slope characteristic.

The output of dispersive delay line 86 is coupled to output line 112 that is in turn coupled to multiplier 88 which as its other input the output of chirp generator 90. The chirp characteristic of chirp generator 90 is inverted with respect to that of chirp generator 80. The result is a de-chirped time domain signal 120 which corresponds to the original offending signal to which the path transfer function is added. This signal thus has characteristics that are identical to that which would be received at receive antenna 54.

The de-chirped signal 120 is inverted by an inverter 122, such that when it is coupled by coupler 72 into receive path 68 the inverted signal cancels the offending signal that arrives at antenna 54. This is because the inverted offending signal is summed with the received signals from antenna 54 to null out the offending signal. The result is a clean received signal 122 with the offending signal nulled out.

To the extent that the nulls are not perfect, coupler 74 is used to monitor the deepness of the nulls involved in the cancellation process and to provide a feedback signal over line 124 to alter the originally stored transfer function. In order to correct the path transfer function, coupler 74 taps off a voltage from the receive path. If the originally measured transfer function was correct, then there would be zero voltage plus the noise floor at coupler 74 as the cancellation error voltage. If there is incomplete cancellation there will be some cancellation error voltage above the noise floor that is present at the coupler.

The procedure is to take the 32 coefficients of the transfer function and vary them one at a time, with each iteration resulting in 32 differential measurements of the cancellation error voltage at coupler 74. In order to arrive at those coefficient values of the transfer function that result in best cancellation, one can employ a least mean squared algorithm.

In order to know how to change the coefficients, the direction of the cancellation error voltage change for a given change of coefficients can be ascertained. This is most conveniently accomplished using a steepest descent method. The result of the steepest descent method is to not only sense the cancellation error voltage and not only sense the direction of the descent of the error voltage, but also to arrive at those changes to the coefficients which will more quickly reduce the cancellation error voltage.

Using the steepest descent method described below one can iteratively and rapidly adjust the coefficients in the path transfer function to reduce the cancellation error voltage to an absolute minimum. This automatic alteration of the path transfer function assures the best possible cancellation of the offending signal.

Thus, the adaptive control for updating the transfer function uses a least mean square (LMS) algorithm to find the amplitude and phase changes needed to update the transfer function as time progresses. The LMS algorithm uses a gradient based steepest decent method that makes successive corrections to the transfer function which eventually leads to a minimum mean square cancellation of the interfering signal.

As to the method of steepest descent, the method of steepest decent is a well known procedure used to optimize a system which is controlled by an array of parameters. The parameters are adjusted to achieve a desired condition, which in the case of the wide band interference canceller, is a minimum error voltage at the sampling point 74 in FIG. 3. The parameters to be adjusted are the transfer function values in the transfer function memory, 68, in FIG. 5A. The transfer function parameters are interpreted as the variables of a multidimensional system the objective of which is to minimize the mean square error voltage.

The first step is the measurement of the gradient vector of the mean square error voltage. The i th component of the gradient vector is the partial derivative of the mean square error voltage with respect to the i th transfer function parameter. If there are 32 transfer function parameters, then the gradient vector has 32 components. The changes in the transfer function parameters for each iteration are governed by the vector equation:

$$W(n+1) = W(n) + \tfrac{1}{2} k(-\nabla E^2)$$

where W is the transfer function parameter vector, $E^2$ is the mean square error, $\nabla$ is the gradient vector operator, and k is the step size parameter. After the gradients are measured, the step size parameter is varied in the direction of the negative gradient until a minimum in the mean square error function is found, signaling the end of the n th iteration. The gradients are measured again applying the new transfer function parameters and the process is repeated continuously. Convergence to a minimum mean square error will occur and should be maintained.

Note that in FIG. 5A the stored transfer function module, 60, employs processing to calculate the gradients of the cancellation level from feedback 76 of FIG. 5B and to then successively correct the transfer function to optimize the cancellation.

An additional benefit of the LMS process is the automatic correction of errors in the actual dispersive delay lines. The errors in the delay lines are equivalent to errors in estimating the transfer function. This methodology is described in U.S. Pat. No. 5,079,735.

While it was supposed in the above discussion that one could measure the transfer function of the path between the transmit antenna and the receive antenna, it is not necessary to be able to initially measure this transfer function.

What is accomplished by the subject system is as follows. The subject system provides a system involving an offending signal antenna and transmitter on one side of a vehicle, and a receiver on the other side of the vehicle. The offending transmitter in one case is a jammer. One wants to make sure regardless of the frequency of the jamming signal that this signal can be cancelled out of the receive path of the receiver. Noting that there is a path transfer function between the jamming antenna and the receive antenna, this transfer function takes into account all kinds of scattering that goes on at the vehicle as a wave propagates from the jamming antenna to the receive antenna. The transfer function which characterizes this wave as it transits from the jamming antenna to the receiver varies considerably because of the multi-path involved.

The problem is if one wants to cancel out the offending signal one has to modify the tapped signal by the path transfer function so that by the time the tapped signal is used in the canceling process it takes into account this path transfer function. It is noted that the path transfer function takes into account distortions, nulls, phase shifts and the like, depending on for instance how many antennas there are on the vehicle and the nature of the vehicle. Note it is extremely convenient to be able to manipulate the path transfer function in the frequency domain. This can be done by simply vector multiplying the frequency domain offending signal by the appropriate transfer function that one has measured. Whereas the narrow band systems of the prior art can only manipulate one frequency at a time, the subject system processes signals across the entire frequency spectrum of interest.

It is noted that it is impossible to use a standard Fast Fourier Transform device because one would need 24 bits to be able to achieve the kind of nulls that one is interested in, namely 60 dB nulls. Present FFT processes do not come with 24 bit analog-to-digital converters. Current analog-to-digital converters do not have enough bits to achieve a Fast Fourier Transform over a wide bandwidth which may be as wide as a gigahertz. Theoretically one could achieve the subject processing utilizing a Fast Fourier Transform, but there are presently is no ability to obtain enough bits and enough bandwidth with state of the art devices.

Moreover, when one converts signals utilizing analog-to-digital converters one obtains spurs.

In summary, in the subject system an interfering signal is sampled using a coupler and the sampled continuous waveform then undergoes a Chirp Fourier Transform which produces a spectrum of amplitudes versus frequencies. A sample of the path transfer function is vector multiplied with the sampled interfering signal. This is done in the frequency domain in a continuous convolution process resulting in a frequency domain representation of both the interfering signal and the path transfer function.

As noted above, the utilization of a dispersive delay line with a delay characteristic inverse to that of the original delay line provides an Inverse Chirp Fourier Transform to reverse the frequency domain signal back into the time domain, whereupon a processed and inverted sampled signal is summed into the receive path to cancel the interfering signal from the incoming signal.

Figure 6:
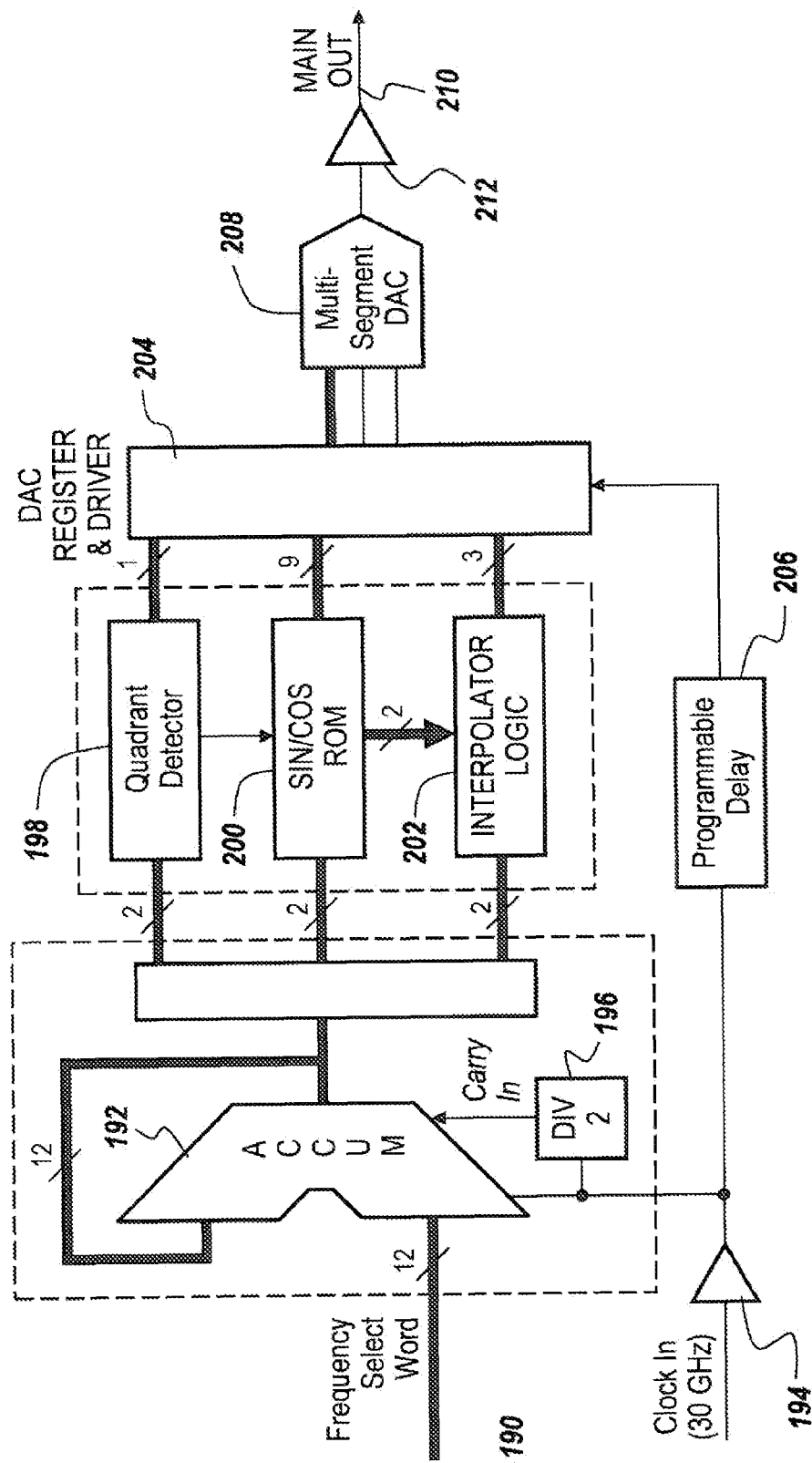
FIG. 6 is a diagrammatic illustration of a chirp generator using a direct digital synthesizer approach; and, FIG. 7 is a diagrammatic illustration showing the surface electromagnetic wave dispersive delay line geometry.

As to the critical components of the subject system and referring now to FIG. 6, one of the critical components is the chirp generator. A chirp generator is not much more than a sinusoid generator whose frequency increases over a specified time period, resets and then repeats. In the subject system one can utilize a direct digital synthesizer (DDS) approach in which the frequency and amplitude of the sinusoid is controlled through a digital interface. The purpose of this component is to provide a frequency chirped output by which to multiply an interference sample. This translates the sample bandwidth up to another frequency and basically constitutes an all-analog frequency translator. The result of utilizing the direct digital synthesizer approach is to reduce size and weight of the delay lines. Such a DDS chip design fabrication technology is available from BAE Systems which provides frequency agile (digitally) synthesized transmitters (TFAST) in which BAE Systems holds the patent on the fastest DDSs operating at 30 GHz, namely U.S. Pat. No. 7,565,392 incorporated herein by reference.

In general, in the above DDS, waveforms are stored in memory and the system steps through the memory at a fixed rate. Using many small steps equates to a lower frequency and fewer larger steps equates to a higher frequency. The DDS employs an adder accumulator which in turn utilizes a carry circuit as well as a sum logic circuit with an integrated latch. There is typically some form of a digital signal processor (DSP) that generates the input word to the phase accumulator and controls the frequency of the generated sine wave. The DSP establishes the frequency command phase increment, and sets the size of the phase steps, thereby establishing the frequency. In general, any type of data register will work, wherein the number of bits determines the frequency resolution.

The DDS typically has an adder-accumulator section wherein the accumulator is clocked by an oscillator and adds increment from the frequency command to the previously stored value at each pulse. As noted, the input word (frequency control word) from the DSP to the adder-accumulator controls the frequency of the generated sine wave. The adder and accumulator are configured in a feedback configuration and the adder generally requires a very fast N-bit adder.

More specifically, referring to FIG. 6, in order to provide a direct digital synthesizer a frequency select word 190 is applied to an adder-accumulator 192 that is clocked with a 30 GHz clock 194, with the clock output being divided by two by divide-by-two counter 196 coupled to accumulator 192 to provide a clock for the carry circuit of adder-accumulator 192. The output of the accumulator is applied to a quadrant detector 198, a sin/cos ROM 200 and interpolator logic 202 that functions as a sum logic circuit with integrated latch. The outputs of these devices are coupled to a digital-to-analog converter register and driver 204 under the control of a programmable delay 206. The output of DAC register and driver 204 is coupled to a multi-segment digital-to-analog converter 208 which provides an analog sine wave output 210 from an amplifier 212. The programmable delay and the frequency select word permit outputting of a chirped signal throughout the indicated bandwidth.

Another critical element is the delay line. In one embodiment, a surface electromagnetic dispersive (SEW) delay line such as described in U.S. Pat. No. 4,808,950 assigned to the assignee hereof and incorporated herein by reference, is used. This delay line can be described as a dielectric coded single wire transmission line. It is noted that this element combined with a chirp generator is an analog implementation of a Fourier transform.

Figure 7:
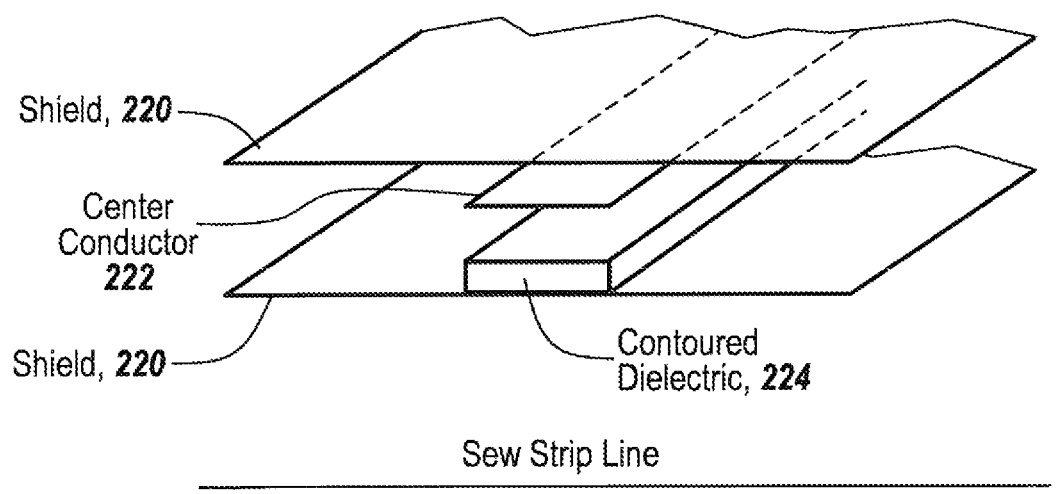

Referring to FIG. 7, an improvement to the dispersive delay line of U.S. Pat. No. 4,808,950 utilizes modern high dielectric constant materials and optimizes the dimensions of the geometry to provide an enhanced dispersion in the delay line. Note one embodiment of the Goubou delay line operates as an HE11 mode dielectric wave guide. Here the wave guide includes shields 220 about a center conductor 222 and a contoured dielectric 224. Low loss dielectrics such as barium tetratitanate are candidates for this structure. A titanium dioxide SEW dispersive line has been built with a bandwidth of 2 GHz and dispersion of 20 ns at a center frequency of 18 GHz which is directly applicable to the subject wide band cosite mitigation system. This SEW line can be manufactured in the form of a spiral, noting that this spiral does not deleteriously affect the dispersion. Such a structure has dimensions of 1.5×2.5 inches.

As to the I/Q vector modulator 62', it is the purpose of using an I/Q vector modulator to invert phase and readdress and readjust the original transfer function T(f) as environmental conditions change. Phase and gain adjustment is done by a digital controller contained in an adaptive control element within the adaptive control loop.

In terms of the adaptive control of T(f), cancellation depth is related to how accurate the path transfer function measurement is. To ensure a good phase/amplitude match between the interfering signal and the victim receiver, and as described in the appended source code, an adaptive loop is implemented that updates the original transfer function measurement as environmental conditions such as multi-path and surroundings change. This component, in one embodiment measures the T(f) estimate, stores updates to T(f), performs the up conversion from base band to CFT sweep frequencies and is the controller to I/Q vector modulator 62'.

While the subject system has application for eliminating the interference caused by two co-located antennas in which interfering signals are to be eliminated at a receiving antenna, as will be made clear, the subject system may be also utilized in situations where a path transfer function is not available.

However when communications antenna are co-located or cosited on a vehicle, the transfer function between the two may be measured readily.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A system for canceling wide band interference as a result of signals arriving at a receiver from a cosited transmitter, comprising:
a canceller operating to sample signals from said transmitter, and having a first converter for transforming said sampled signals from the time domain into the frequency domain, a multiplier for adding a path waveform transform to said frequency domain signals, a second converter for transforming the resultant frequency domain signal into a time domain signal, an inverter for inverting said time domain signal, and a coupler for injecting said inverted signal into the receive path of said receiver for the cancellation of that portion of the signal transmitted by said transmitter that arrives at said receiver.

2. The system of claim 1, wherein said first converter includes a Chirp Fourier Transform.

3. The system of claim 2, wherein said second converter includes an inverse Chirp Fourier Transform.

4. The system of claim 3, wherein said inverse Chirp Fourier Transform is implemented utilizing an inverse dispersive delay line and a second chirp generator.

5. The system of claim 4, and further including a multiplier for multiplying the output of said inverse dispersive delay line with the output from said second chirp generator.

6. The system of claim 5, wherein the time versus frequency characteristic of said inverse dispersive delay line is opposite to the time versus frequency slope characteristic of said dispersive delay line.

7. The system of claim 6, wherein the signal from said transmitter has a bandwidth of $\Delta$ and wherein the slope of the characteristics of said delay lines extends from zero to a frequency twice the input bandwidth and extends in time from zero to 2T, where T is the time delay associated with a delay line.

8. The system of claim 3, wherein the slope of the chirp of said second chirp generator is opposite to the chirp of said first chirp generator, thus to de-chirp the time domain signal from said inverse delay line.

9. The system of claim 2, wherein said Chirp Fourier Transform is implemented utilizing a first chirp generator and a dispersive delay line having a predetermined delay characteristic.

10. The system of claim 9, wherein the signal coupled from said transmitter is multiplied by the output of said first chirp generator, with the result coupled to said dispersive delay line.

11. The system of claim 1, wherein the path transfer function between said transmitter and receiver is stored, and wherein said multiplier includes a vector multiplier for multiplying said frequency domain signal by said path transfer function and for applying the result to said second canceller for transforming the said frequency domain signal to said time domain signal.

12. The system of claim 11, wherein said vector multiplier includes an I/Q vector modulator.

13. The system of claim 1, wherein said transmitter has an antenna and a transmit path from said transmitter to said antenna, and wherein said coupler taps off a portion of the signal from said transmitter to said antenna and couples said tapped signal to said Chirp Fourier Transform.

14. The system of claim 1, and further including a second coupler for coupling said inverted signal into the receive path of said receiver.

15. The system of claim 1, and further including a third coupler for coupling the signal in said receive path to provide a feedback signal used to monitor the quality of the nulls of the signal from said transmitter in said receive path.

16. The system of claim 15, wherein said feedback signal is utilized to modify said path transfer function.

* * * * *